(12) United States Patent
Jann et al.

(10) Patent No.: US 7,623,427 B2
(45) Date of Patent: Nov. 24, 2009

(54) SURFACE INSPECTION BY AMPLITUDE MODULATED SPECULAR LIGHT DETECTION

(75) Inventors: Peter C. Jann, Santa Clara, CA (US);
Wafaa Abdalla, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 483 days.

(21) Appl. No.: 11/654,438

(22) Filed: Jan. 17, 2007

(65) Prior Publication Data
US 2007/0165504 A1    Jul. 19, 2007

Related U.S. Application Data

(60) Provisional application No. 60/759,756, filed on Jan. 18, 2006.

(51) Int. Cl.
*G11B 11/00* (2006.01)

(52) U.S. Cl. ............................... 369/53.15; 356/237.2

(58) Field of Classification Search ........................ None
See application file for complete search history.

(56) References Cited

U.S. PATENT DOCUMENTS 6,529,270 B1 * 3/2003 Bills ...................... 356/237.2
7,315,365 B2 * 1/2008 Chen et al. .............. 356/237.2

OTHER PUBLICATIONS

A. Vanderlugt & A.M. Bardos; *Design Relationships for Acousto-Optic Scanning Systems*; Applied Optics; vol. 31, No. 20, Jul. 10, 1992.

* cited by examiner

*Primary Examiner*—Paul Huber
(74) *Attorney, Agent, or Firm*—David K. Lucente

(57) ABSTRACT

An apparatus for detecting defects on a disk surface includes a light source that generates a light beam and a beamsplitter that splits the light beam into a first light beam portion and a second light beam portion. The first light beam portion illuminates the surface of the disk and produces a reflected light beam. An acoustic-optic deflector deflects the reflected light beam and the second light beam portion producing a deflected output beam having a deflection angle. A detector detects an incident beam translation signal corresponding to reflected light beam angular deflection and acoustic-optic deflector beam angular deflection from the deflected output beam.

20 Claims, 6 Drawing Sheets

SURFACE INSPECTION BY AMPLITUDE MODULATED SPECULAR LIGHT DETECTION

CROSS-REFERENCE TO RELATED PATENT APPLICATIONS

Embodiments of the present invention relate to U.S. Provisional Application Ser. No. 60/759,756, filed Jan. 18, 2006, entitled the same, the contents of which are incorporated by reference herein and which is a basis for a claim of priority.

BACKGROUND OF THE INVENTION

1. Field of the Invention

Embodiments of the present invention relate generally to the optical detection of defects in disk storage media. In particular, embodiments of the present invention relate to a method and apparatus for optically detecting defects on the surface disk storage media using a differential amplitude modulation subsystem which produces an output signal with a very high signal-to-noise ratio to significantly enhance disk surface and surface event slope detection sensitivity.

2. Related Art

Disk drives typically employ one or more rotatable disks in combination with transducers supported for generally radial movement relative to the disks. Each transducer is maintained spaced apart from its associated disk, at a "flying height" governed by an air bearing caused by disk rotation. Present day transducer flying heights typically range from about 25 nm to about 50 nm, and experience velocities (relative to the disk, due to the disk rotation) in the range of 5-15 m/sec.

Effective recording and reading of data depend in part upon maintaining the desired transducer/disk spacing. Currently the amount of data that can be stored on the disk (i.e., the aerial density) is of great concern. As the aerial density increases and the flying height decreases, various surface defects in an otherwise planar disk surface of ever shrinking size become more and more significant. Thus, these defects or flaws can interfere with reading and recording, and present a risk of damage to the transducer, the disk recording surface, or both.

Therefore, the need arises for optically detecting, discriminating and measuring axial run-out and defects such as lumps, pits, scratches, micro-events, particles, etc. on the surface of disk storage media.

SUMMARY OF THE DISCLOSURE

Embodiments of the present invention address the problems described above and relate to a method and apparatus for optically detecting, discriminating and measuring defects on the surface of disk storage media.

According to one embodiment of the present invention, an apparatus for detecting defects on a disk surface includes a light source that generates a light beam and a beamsplitter that splits the light beam into a first light beam portion and a second light beam portion. The first light beam portion illuminates the surface of the disk and produces a reflected light beam. An acoustic-optic deflector deflects the reflected light beam and the second light beam portion producing a deflected output beam having a deflection angle. A detector detects an incident beam translation signal corresponding to reflected light beam angular deflection and acoustic-optic deflector beam angular deflection from the deflected output beam.

DETAILED DESCRIPTION OF THE PREFERRED EMBODIMENTS

A surface detection apparatus and method is described. In the following description, numerous details are set forth. It will be appreciated, however, to one skilled in the art, that embodiments of the present invention may be practiced without these specific details. In other instances, well-known structures and devices are shown in block diagram form, rather than in detail.

Figure 1:
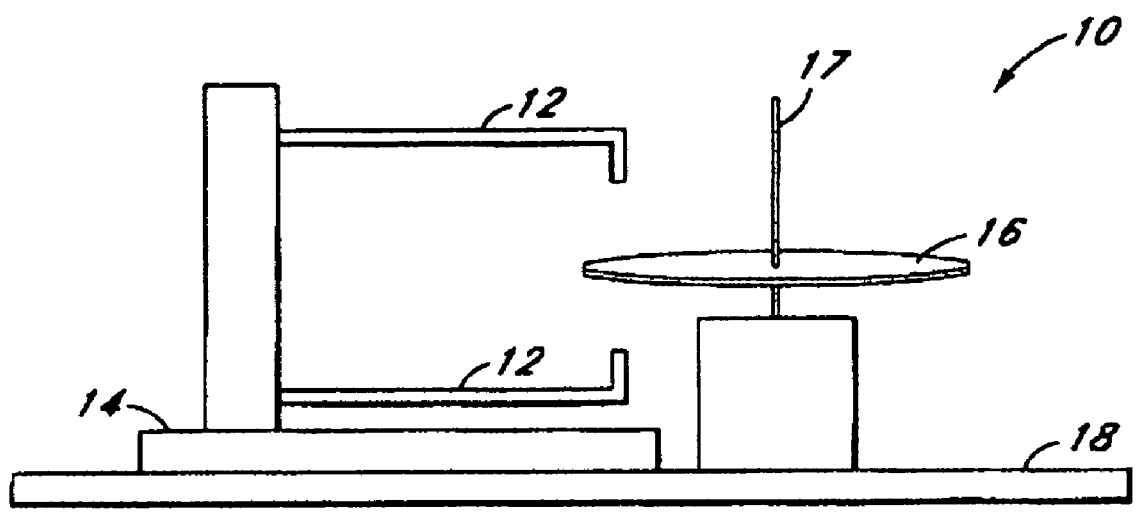
FIG. 1 illustrates generally an amplitude modulated specular light advanced optical inspection system for inspecting disk surfaces according to one embodiment of the present invention.

An explanation will be given below regarding embodiments of the present invention while referring to the attached drawings. As shown in FIG. 1, an embodiment of an amplitude modulated specular light advanced optical inspection system of the present invention, generally illustrated at 10, includes dual sensor heads 12 mounted on a carriage 14 and situated in relation to a magnetic disk substrate 16 such that one sensor head monitors a first surface of the disk 16 while the other sensor head monitors a second surface of the disk 16. The magnetic disk substrate 16 is rotated about an axis 17 during operation of the inspection apparatus.

The carriage 14 is preferably movable along a track 18 so that the optical inspection system of the present invention can be used to produce a scan of an entire disk as the carriage 14 is translated along the radius of the disk 16 as it is rotated. Each of the sensor heads 12 is capable of distinguishing bumps, pits, scratches and micro-events from surface contamination and quantitatively characterizing the geometry of the former while providing information regarding their location on the medium being examined.

Figure 2:
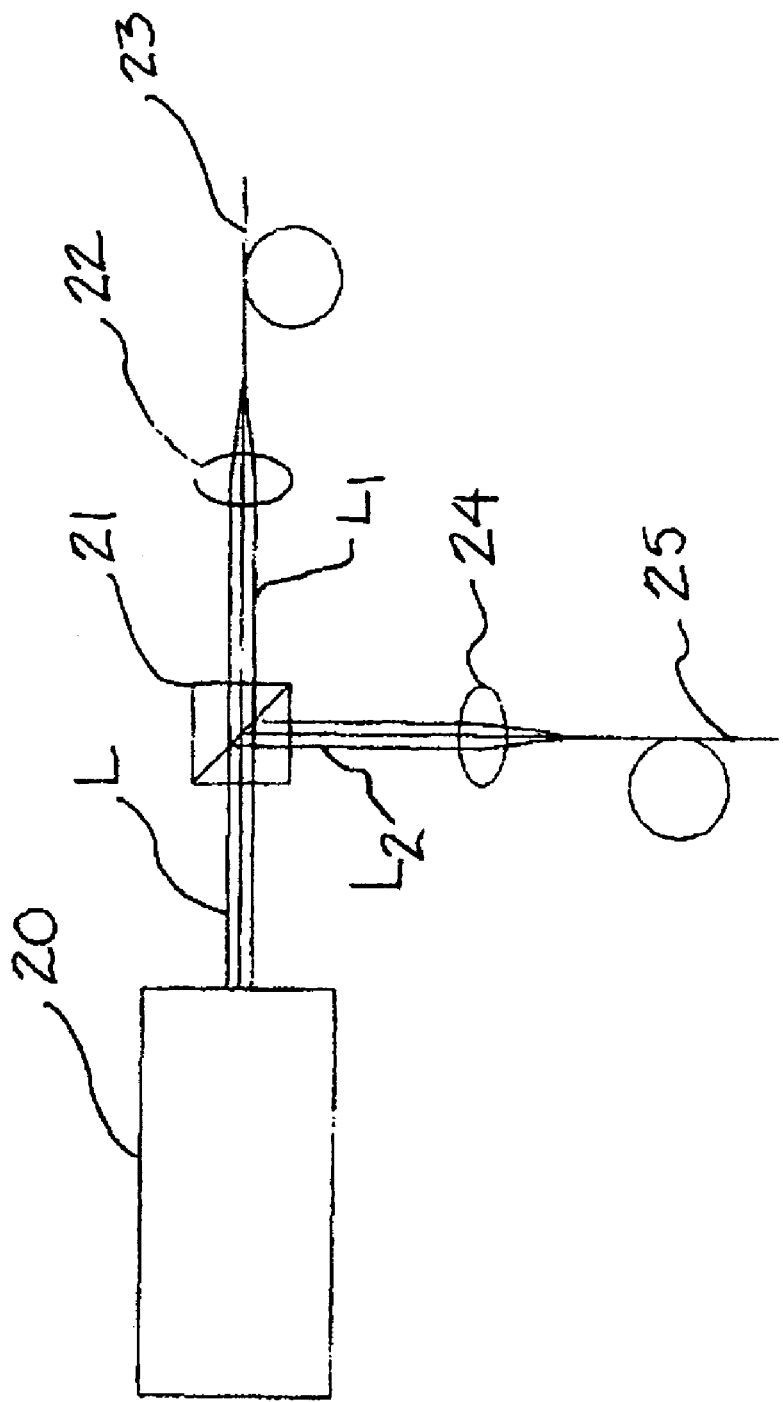
FIG. 2 illustrates a delivery module of a sensor optical illumination module for the amplitude modulated light advanced optical inspection system according to one embodiment of the present invention.

FIG. 2 illustrates the delivery module of the sensor optical illumination module for the sensor heads 12 of the amplitude modulated specular light advanced optical inspection system according to one embodiment of the present invention. The delivery module includes a laser 20, a 50/50 beamsplitter 21, a first lens 22, a second lens 24, a first polarization maintaining fiber (PMF) 23 and a second PMF 25. According to one embodiment of the present invention, the lenses may be asphere lenses and the laser 20 may be a semiconductor with a thermo-electric cooler. For example, the laser 20 is a single solid-state laser with a wavelength of 405 nm that is used to drive the top and bottom sensor heads 12 illustrated in FIG. 1.

The output beam L of the laser 20 is then split into two different beams, $L_1$ and $L_2$, at the 50/50 beamsplitter 21. Regarding the path of the $L_1$ beam, in the embodiment shown in FIG. 2, the $L_1$ beam is modulated by lens 22 provided downstream of the 50/50 beamsplitter 21 on to the first PMF 23. Turning to the path of the $L_2$ beam, in the embodiment shown in FIG. 2, the $L_2$ beam is modulated by lens 24 positioned downstream of the 50/50 beamsplitter 21 on to the second PMF 25. In an alternative embodiment of the present invention, free-space beamsplitting or fiber beamsplitting may be used depending on the type of laser used as the light source.

In a number of embodiments of the present invention, the first PMF 23 is coupled to the upper sensor head and the second PMF 25 is coupled to the lower sensor head. With this arrangement, approximately 15 mW of linearly polarized light will be delivered to each of the sensor heads 12. According to one embodiment of the present invention, high precision kinematics fiber couplers may be used to permit easy laser replacement.

Figure 3:
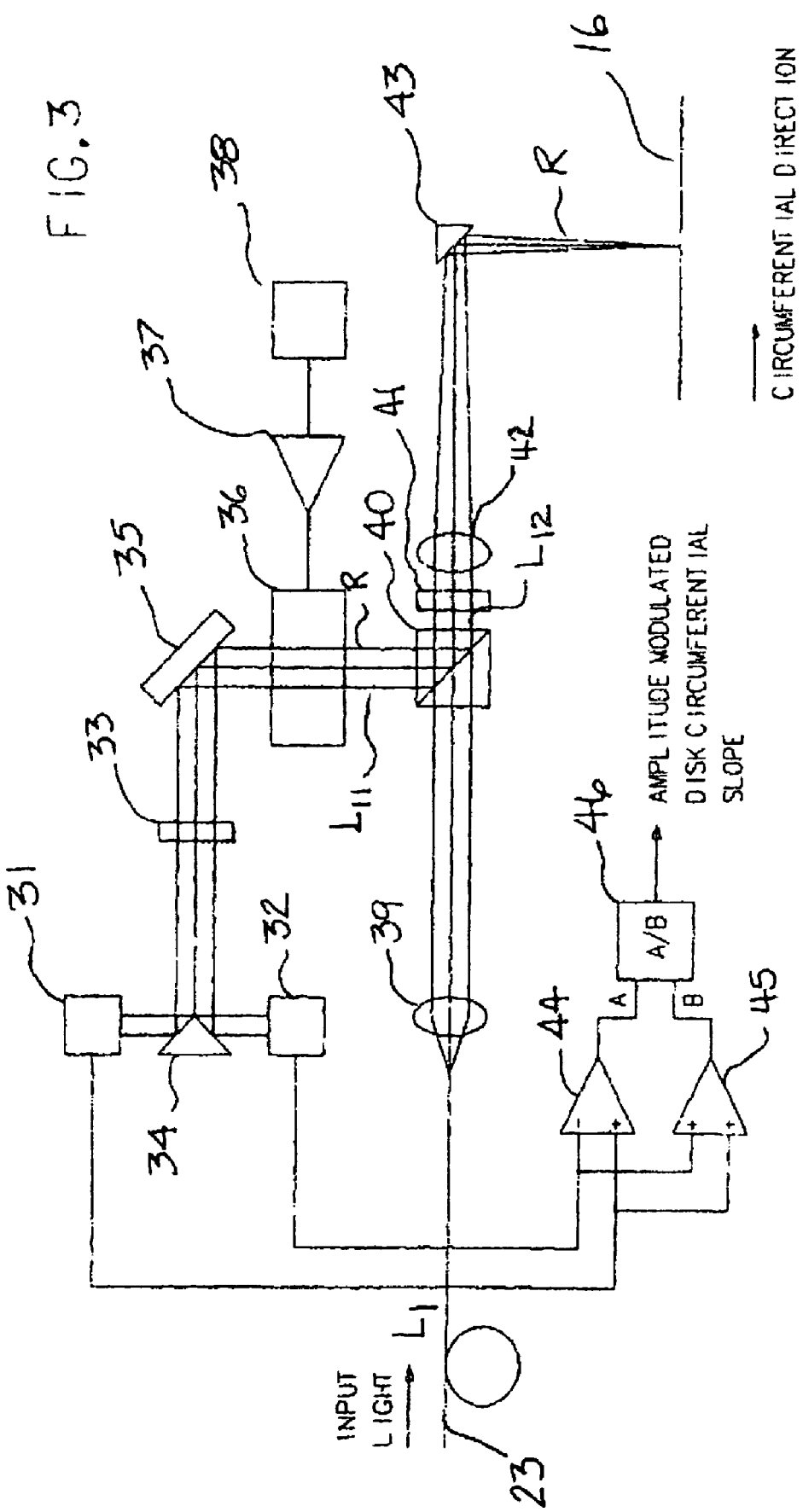
FIG. 3 illustrates the sensor optical illumination module and a sensor brightfield collection optical module for the amplitude modulated specular light advanced optical inspection system according to one embodiment of the present invention.

Referring now to FIG. 3, which illustrates the sensor optical illumination module and a sensor brightfield collection optical module for the amplitude modulated specular light advanced optical inspection system according to one embodiment of the present invention, only one sensor head 12 (the upper sensor head illustrated in FIG. 1) will be shown to avoid unnecessary duplication, since the two sensor heads are substantially the same. The sensor module for the amplitude modulated specular light advance optical inspection system includes the first PMF 23 from the sensor optical illumination module illustrated in FIG. 2, first and second photomultiplier tube (PMT)s 31 and 32, respectively, first and second prism mirrors 34 and 43, respectively, linear polarizer 33, flat mirror 35, polarized beamsplitter (PBS) 40, quarter-wave plate 41 and first and second lenses 39 and 42, respectively.

The sensor optical illumination module and a sensor brightfield collection optical module for the amplitude modulated specular light advance optical inspection system further includes an acousto-optic deflector (AOD) 36, an acousto-optic deflector amplifier (AODA) 37, a signal generator 38, differential and summation amplifiers 44 and 45, respectively, a divider network 46 and the magnetic disk 16. Referring to the path of the output beam $L_1$, from the PMF 23, the beam is first collimated by lens 39 and then split by the PBS 40 into beams $L_{11}$ and $L_{12}$. Beam $L_{11}$ serves as the reference beam while beam $L_{12}$ serves as the illumination beam. Illumination beam $L_{12}$ is sent to the quarter-wave plate 41 and then to plano-convex lens 42 provided downstream of the PBS 40. Afterwards, illumination beam $L_{12}$ is forwarded to the second prism mirror 43 before being received by the magnetic disk 16.

According to one embodiment of the present invention, the magnetic disk 16 is illuminated from above by the illumination beam $L_{12}$ with a circular diffraction-limited spot of light that typically has a $1/e^2$ diameter of about 10 μm for example. This focused spot of light is produced by the plano-convex lens 42. For example, the plano-convex lens 42 is normally incident and uses circular polarization. As such, circumferential and radial scratches on the magnetic disk 16 will be equally illuminated.

According to an embodiment of the present invention, illumination beam $L_{12}$ is preferably incident at a normal or near-normal angle to the surface plane of the disk 16. If the surface of the disk 16 has a defect which imparts a local non-zero slope to the disk 16, the illumination beam $L_{12}$ will be reflected specularly according to the law of reflection at a given angle equal to the angle the illumination beam $L_{12}$ makes with the extended local normal to the disk 16. Thus, the angle that the local region of the surface of the disk 16 makes with the plane of the disk surface can be directly measured by determining the angle made by the specularly-reflected beam.

The brightfield collection optical module (i.e., the second prism mirror 43, the plano-convex lens 42, the quarter-wave plate 41, and the PBS 40) collects the specular or non-scattered light beam R that is reflected by the surface of the magnetic disk 16. This reflected specular collimated light beam R is then made to interfere with the reference beam $L_{11}$ on the surface of the AOD 36. According to one embodiment of the present invention, the AOD 36 receives an amplified signal from the signal generator 38 via the AODA 37. In one example, the amplified signal is a frequency chirped triangle-wave having a fundamental frequency chirp range on the order of 0 to 120 MHz.

Figure 5:
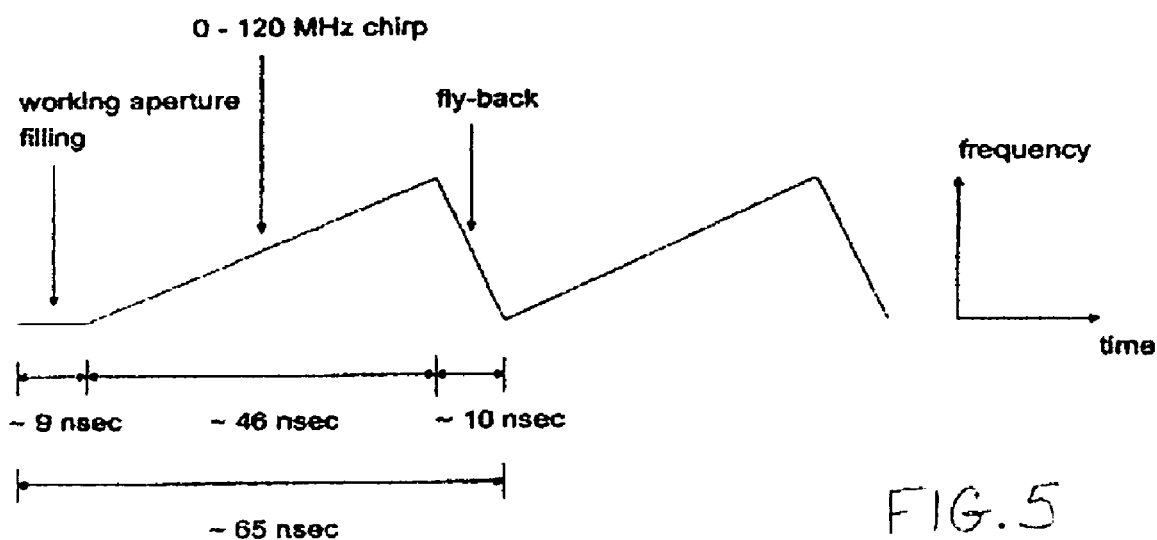
FIG. 5 illustrates a chirp signal timing diagram for an acousto-optic deflector according to one embodiment of the present invention.

As illustrated in FIG. 5, which shows a chirp signal timing diagram for AOD 36 according to one embodiment of the present invention, a chirp signal has a period of 65 ns and ranges between 0 to 120 MHz. With chirp modulation, the frequency of the signal is deliberately changed in a systematic way as shown in FIG. 5. The output from AOD 36 is a deflected beam that exhibits a deflection angle in the range of about +/−2 degrees for example, occurring at a rate of 15.4 MHz as discussed in greater detail below.

Both the illumination spot size and the rotational speed of the magnetic disk 16 are chosen to permit the proper amplitude modulation of the disk surface reflected beam angular deflection signal pulses and to place the corresponding signal frequency pass-band filter beyond that of the subsequent amplifier electronics 1/f noise as discussed in greater detail below. Referring back to FIG. 3, the deflected output beam from the AOD 36 travels along an optical path which includes the flat mirror 35, the linear polarizer 33, the first prism mirror 34 and the first and second PMTs 31 and 32, respectively. Thus, the deflected output beam from the AOD 36 is collimated again by the flat mirror 35 and the linear polarizer 33 before reaching the first prism mirror 34. The deflected output beam illuminates the first prism mirror 34 which produces two output beams sent to the first PMT 31 and the second PMT 32. Thus, the first prism mirror 34 and the first and second PMTs 31 and 32, respectively, operate as a detector of the deflected output beam. The detected output light beam by the second prism mirror and the PMTs 31 and 32; produces current pulses as the defects pass through the focused illumination spot on the disk 16, whose amplitudes are proportional to the size of the defects and the deflected angle or the AOD. As a consequence, the first prism mirror 34 and the PMTs 31 and 32 detect an incident beam translation signal as a consequence of both disk surface reflected beam angular deflection and also AOD output beam angular deflection.

For the example discussed above with respect the chirp signal timing diagram of FIG. 5, in order to obtain a frequency rate of 15.4 MHz with the chirp signal having a period of 65 ns and a frequency range between 0 to 120 MHz, the illumination beam $L_{12}$ has to be focused to a spot of light that has a $1/e^2$ diameter of about 40 μm. In an alternative embodiment of the present invention, for a 95 mm disk spinning at 20,000 rpm with a surface defect located at the outer radius of the disk, the beam illuminating the disk must be focused to a 32.6 μm $1/e^2$ diameter spot in order for the beam hitting the first prism mirror 34 to be dithered at least ten times while the defect is still within the illumination spot. Alternatively, an illumination spot with a 10 μm $1/e^2$ diameter spot will only have 3.3 dither cycles at 20,000 rpm and 6.5 dither cycles at 10,000 rpm. If an output beam with a lower deflection is required, then the chirp frequency range can be reduced with an increase in the period. Thus, an even smaller illumination spot is allowed.

The output signals from the first PMT 31 and the second PMT 32 are differentially summed and then normalized by the differential amplifier 44, the summation amplifier 46 and the divider network 46. The differential summation of the output signals produces a polarized output signal with a fundamental frequency that is amplitude modulated by the disk surface circumferential slope created by the detected defects on the surface of the disk. The normalization of the output signals minimize the effects of the photomultiplier incident beam walk-off as a consequence of disk surface radial slope.

Figure 4:
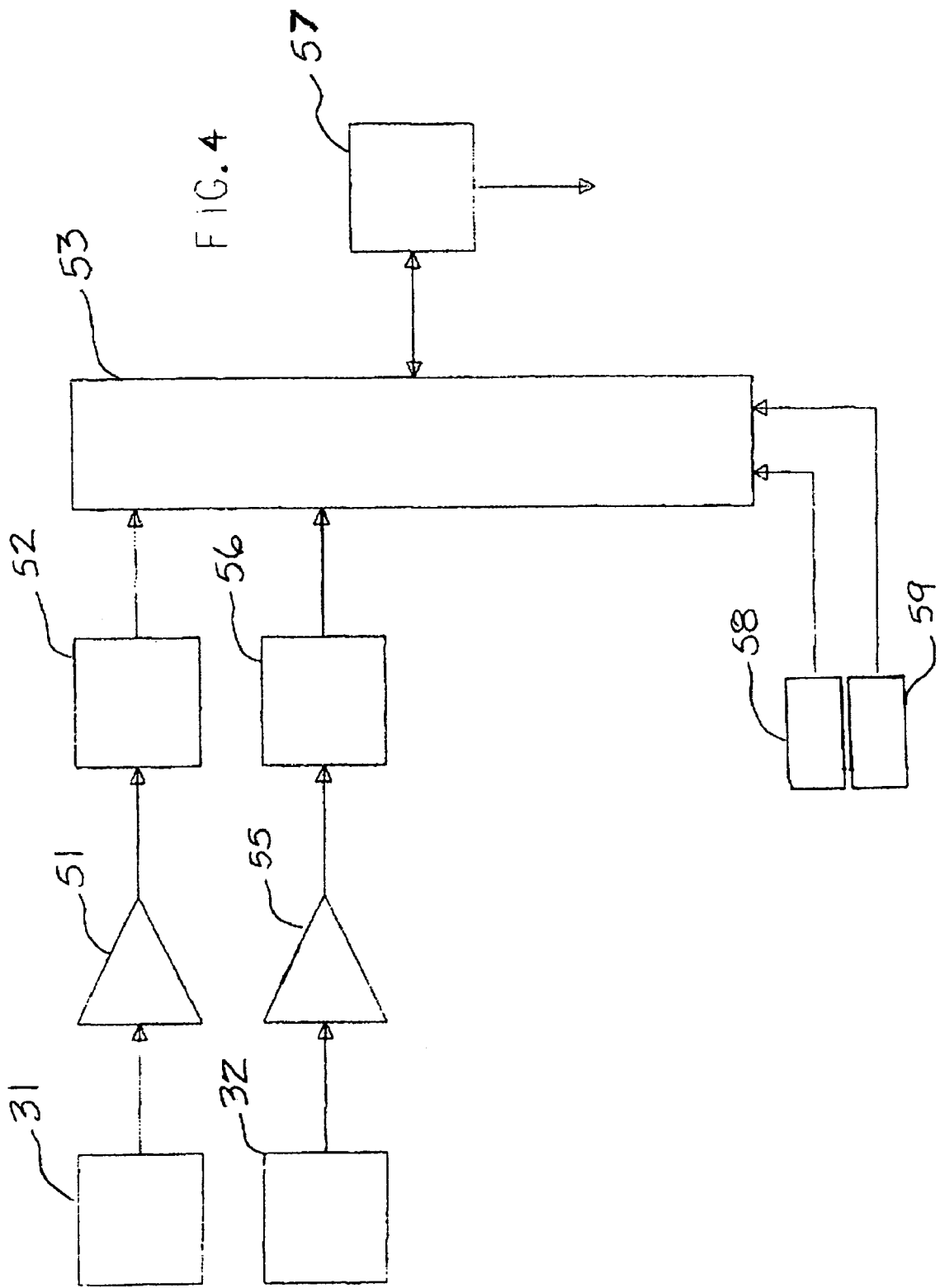
FIG. 4 illustrates the signal processing electronics for the amplitude modulated specular light advanced optical inspection system according to one embodiment of the present invention.

FIG. 4 illustrates the signal processing electronics for the amplitude modulated specular light advanced optical inspection system according to one embodiment of the present invention. For example purposes, the first and second PMTs 31 and 32, respectively, are coupled to the processing electronics which is used to process the signals from the PMTs to determine the presence of the defects on the disk 16. The processing electronics include the first and second PMTs 31 and 32, first and second analog preamplifiers with band-pass filters 51 and 55, respectively, first and second analog-to-digital converters 52 and 56, respectively, and a field programmable gate array 53. The field programmable gate array 53 interfaces with a computer 57 which outputs a defect map or matrix which shows information such as the type, relative size and position of the defect. The field programmable gate array 53 also receives information from inputs 58 and 59 which supply spindle index data and spindle sector data, respectively. A cursory explanation of the signal processing electronics is as follows.

The PMT outputs signals drive the preamplifiers 51 and 55. Thus, the PMTs produce a signal current corresponding to the intensity or power of the light received associated with the ADO 36. The signal current is provided to the preamplifiers 51 and 55 where they are converted into voltages and then amplified. The amplified signals are then band-pass filtered. The band-pass filters provide high-pass filtering for the large amplitude disk axial run-out components and low-pass filtering to prevent aliasing caused by the analog-to-digital converters 52 and 56. The filtered signals are then digitized by the analog-to-digital converters 52 and 56. The digitized signals from the analog-to-digital converters 52 and 56 drive the field programmable gate array 53 which performs all of the remaining signal processing including the necessary amplitude demodulation.

Figure 6:
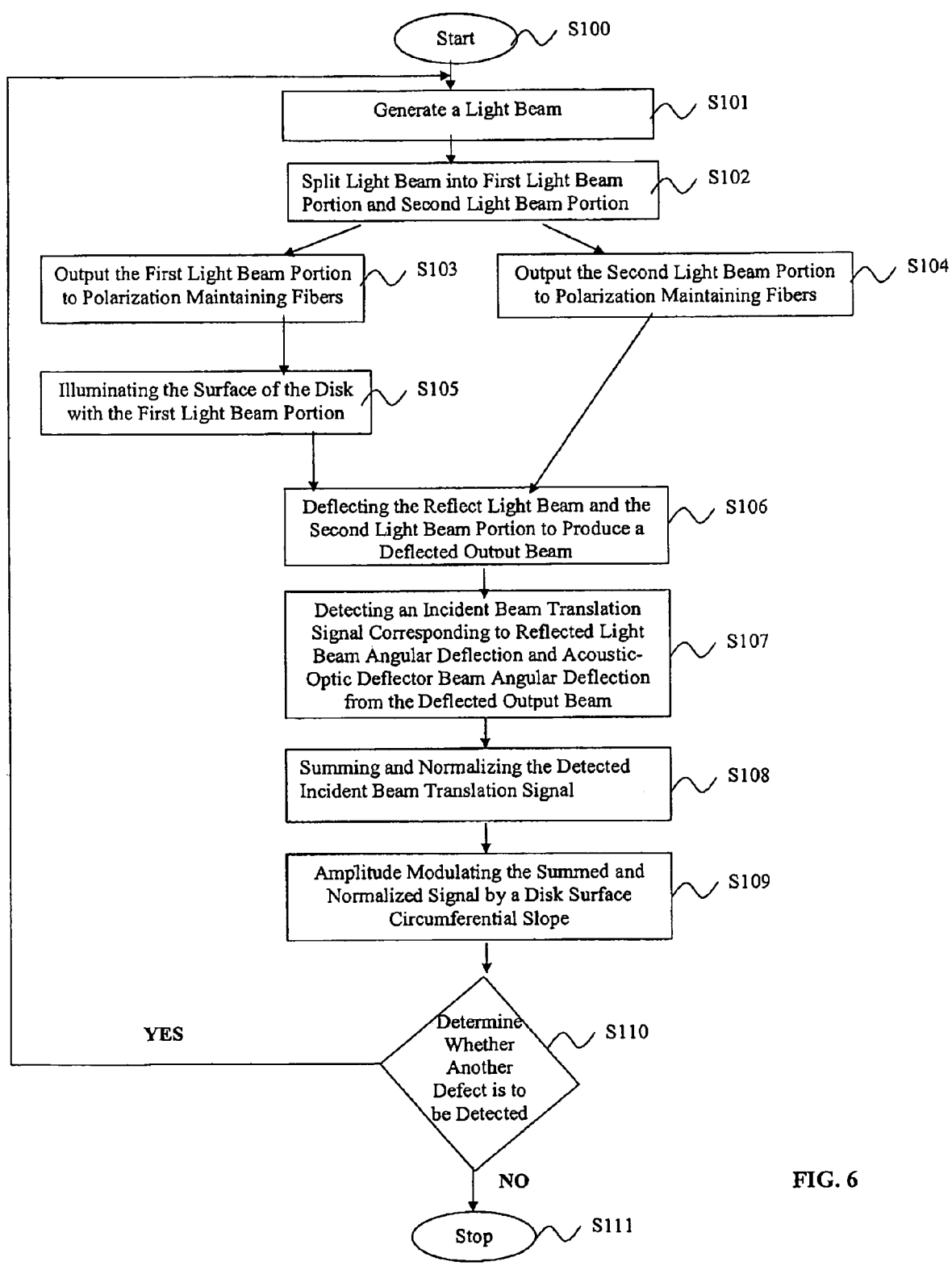
FIG. 6 is a flowchart depicting steps performed within an apparatus for detecting defects on a disk surface in accordance with one embodiment of the present invention.

Referring now to FIG. 6, the operation of an apparatus for detecting defects on a disk surface in accordance with the present invention as embodied in a method is depicted in a flowchart. The process begins from a start state S100 and proceeds to process step S101, where a light beam is generated. At process step S102, the light beam is split into a first light beam portion, which serves as an illumination beam, and a second light beam portion, which serves as a reference beam. According on one embodiment of the present invention, at process step S1103, the first light beam portion is output to polarization maintaining fibers and at process step S104, the second light beam portion is output to polarization maintaining fibers. The first light beam portion is later used to illuminate the surface of a disk at process step S105. The first light beam portion creates an illumination spot on the surface of the disk. This illumination by the first light beam-portion produces a reflected light beam.

At process step S106, the reflected light beam and the second light beam portion are deflected which produces a deflected output beam having a deflection angle. According to one embodiment of the present invention, the deflection angle is generated with a frequency chirped wave. In addition, the deflected output beam may be collimated. At process step S107, an incident beam translation signal corresponding to reflected light beam angular deflection and acoustic-optic deflector beam angular deflection from the deflected output beam is detected. After detecting the incident beam translation signal, the process proceeds to process step S108 which sums and normalizes the detected incident beam translation signal. After the signal has been summed and normalized, the process proceeds to process step S1109 where the signal is amplitude modulated by a disk surface circumferential slope. After a defect has been detected on the surface of the disk, the process proceeds to decision step S110 where it is determined whether another defect is to be detected. If another defect is to be detected, the process returns to process step S101, otherwise, the process terminates at state S111.

According to embodiments of the present invention, the amplitude modulate specular light advanced optical inspection system uses an acoustic-optic deflector to induce amplitude modulation in the output of the optical system. Amplifier electronics low frequency 1/f or "flicker noise" is not present in the demodulated output signal. Thus, an enhanced output signal-to-noise ratio is obtained.

What is claimed is:

1. An apparatus for detecting defects on a disk surface, comprising:
   a light source that generates a light beam;
   a beamsplitter that splits the light beam into a first light beam portion and a second light beam portion, the first light beam portion illuminating the surface of the disk and produces a reflected light beam;
   an acoustic-optic deflector that deflects the reflected light beam and the second light beam portion producing a deflected output beam having a deflection angle; and
   a detector that detects an incident beam translation signal corresponding to reflected light beam angular deflection and acoustic-optic deflector beam angular deflection from the deflected output beam.

2. The apparatus for detecting defects on a disk surface according to claim 1, wherein the deflected output beam is based on an illumination spot size and a disk rotation speed.

3. The apparatus for detecting defects on a disk surface according to claim 1, wherein the detector includes a prism mirror and photomultiplier tubes.

4. The apparatus for detecting defects on a disk surface according to claim 3, further comprising a differential amplifier, a summation amplifier and a divider network.

5. The apparatus for detecting defects on a disk surface according to claim 4, wherein output signals from the photomultiplier tubes are differentially summed and normalized by the differential amplifier, the summation amplifier and the divider network.

6. The apparatus for detecting defects on a disk surface according to claim 5, wherein the summed and normalized signal is amplitude modulated by a disk surface circumferential slope.

7. The apparatus for detecting defects on a disk surface according to claim 1, wherein the light source is fiber optic coupled with polarization maintaining fibers.

8. The apparatus for detecting defects on a disk surface according to claim 1, further comprising a plano-convex lens providing an illumination spot on the surface of the disk.

9. The apparatus for detecting defects on a disk surface according to claim 1, wherein the acoustic-optic deflector is driven with a frequency chirped wave.

10. The apparatus for detecting defects on a disk surface according to claim 1, further comprising a lens that collimates the deflected output beam from the acoustic-optic deflector.

11. A method for detecting defects on a disk surface, comprising:
   generating a light beam;
   splitting the light beam into a first light beam portion and a second light beam portion, the first light beam portion illuminating the surface of the disk which produces a reflected light beam;
   deflecting the reflected light beam and the second light beam portion to produce a deflected output beam having a deflection angle; and
   detecting an incident beam translation signal corresponding to reflected light beam angular deflection and acoustic-optic deflector beam angular deflection from the deflected output beam.

12. The method for detecting defects on a disk surface according to claim 11, wherein the deflected output beam is based on an illumination spot size and a disk rotation speed.

13. The method for detecting defects on a disk surface according to claim 11, further comprising summing and normalizing the detected incident beam translation signal.

14. The method for detecting defects on a disk surface according to claim 13, wherein the summed and normalized signal is amplitude modulated by a disk surface circumferential slope.

15. The method for detecting defects on a disk surface according to claim 11, further comprising providing an illumination spot on the surface of the disk.

16. The method for detecting defects on a disk surface according to claim 11, further comprising generating the deflection angle with a frequency chirped wave.

17. The method for detecting defects on a disk surface according to claim 11, further comprising collimating the deflected output beam.

18. A system for detecting defects on a disk surface, comprising:
   a light source that generates a light beam;
   a beamsplitter that splits the light beam into a first light beam portion and a second light beam portion, the first light beam portion illuminating the surface of the disk and produces a reflected light beam;
   an acoustic-optic deflector that deflects the reflected light beam and the second light beam portion producing a deflected output beam having a deflection angle;
   a detector that detects an incident beam translation signal corresponding to reflected light beam angular deflection and acoustic-optic deflector beam angular deflection from the deflected output beam; and
   a processor coupled to the detector that determines the presence of a defect based on the incident beam translation signal.

19. A system for detecting defects on a disk surface according to claim 18, wherein the deflected output beam is based on an illumination spot size and a disk rotation speed.

20. A system for detecting defects on a disk surface according to claim 18, wherein the detector includes a prism mirror and photomultiplier tubes.

* * * * *